3,154,107
THERMOSETTING RESIN WITH A BLOCKED
PHENOL THEREIN AND A REINFORCED
PLASTIC THEREFROM
Byron M. Vanderbilt, Westfield, N.J., assignor to Esso Research and Engineering Company, a corporation of Delaware
No Drawing. Filed May 29, 1959, Ser. No. 816,724
19 Claims. (Cl. 138—141)

This invention relates to a method for stabilizing a polymer and/or a resin by adding a blocked phenol antioxidant prior to polymerization and/or curing. More particularly, this invention relates to a reinforced plastic therefrom with improved aging properties.

It is known to provide a reinforced plastic comprising a reinforcing element and a resinifiable polymer capable of setting to a hard non-thermoplastic substance when subjected to heat. In the past, such reinforced plastics have been relatively unstable at relatively high temperatures, since no anti-oxidants have been employed therein. This was because, being non-thermoplastic, there was no way to incorporate an anti-oxidant into the resin portion of the laminate. It was believed that all anti-oxidants inhibited the catalytic setting of the resinifiable polymer and could not be incorporated into the resinifiable mix prior to setting of the resin and/or prior to forming the reinforced structure.

It has now been discovered, however, that the aging properties of reinforced plastics can be vastly improved by incorporating a small and controlled concentration of a blocked phenol in the feed prior to fabrication and curing. Thus, in accordance with one embodiment of this invention a resinifiable mixture is prepared containing a blocked phenol therein. A reinforcing element is laminated with this mix and is subsequently cured with little or no decrease in curing rate to provide a unitary product therefrom. This is indeed surprising since anti-oxidants are believed to function as chain terminators of free radical reactions, and the setting of resins by means of peroxides is a free radical type of polymerization. Furthermore, these anti-oxidants are not destroyed during the process.

The reinforcing elements that are applicable to this invention include such items as mineral materials, e.g., glass, asbestos, mica, rock, and celite; vegetable materials, e.g., cotton, linen, rayon, and silk; organic materials, e.g., hair, nylon, and orlon; and metallic materials, e.g., iron, aluminum, and copper. Reinforcing elements may comprise up to 80% by weight of the reinforced plastic, preferably 35 to 80%. However, the preferred material is glass fiber. In accordance with this invention, glass fiber is defined as any fibrous glass and includes filament yarns, rovings, reinforcing mats, staple yarns, woven fabrics, and chopped fibers. A protective size may be applied to glass fibers. Examples of sizes which can be used are as follows: starch-mineral oil mixtures; polyvinyl acetate; polyisobutylene; copolymers of isobutylene with isoprene; and copolymers of butadiene with a styrene. It is within the scope of this invention to use glass fiber which has been treated with an unsaturated organic halo silane, having the formula $R_nSiX_{4-n}$ wherein R is vinyl or allyl group, $n$ is a positive integer equal to 1, 2, or 3, and X is an active group such as alkoxy, aroxy, or halogen. It is also possible to incorporate 0.1 to 5 parts of a silane ester in the resinifiable mix which has the general formula $R_nSi(OR_1)_{4-n}$, wherein R is an unsaturated group, e.g., vinyl, allyl, methallyl, styryl, or crotyl group; $n$ is a positive integer equal to 1, 2, or 3; and $R_1$ is an alkoxy or aroxy group or substitutes thereof. It is believed that the above-described silanes react with the hydroxy groups in the glass. The unsaturated or vinyl portion of the molecule, bound to the glass through the silicon atom, reacts with the polymer during the curing step, thus effectively bonding the curable resin and the glass fiber. A resinifiable polymeric mix is prepared in this invention which comprises a curable polymer, a crosslinking agent, a catalyst, and a blocked phenol antioxidant. Crosslinking agents are added to the mix to impart an effective crosslinking of the curable polymer. Such agents comprise the following compounds: vinyl aromatics such as styrene and vinyl toluene; halo styrenes; vinyl naphthalenes; alkyl acrylates and methacrylates; dialkyl fumarates, e.g., diethyl fumarate, and allyl esters. Preferred compounds are diallyl phthalate and the styrenes. The especially preferred compound is vinyl toluene or monomethyl styrene. The crosslinking agent should be incorporated in the range of 0 to 75 parts per 100 parts of mix, preferably 30 to 50 parts. A catalyst is incorporated in the range of 0.2 to 6 parts, preferably 1 to 4 parts, and should be of the free radical or peroxide type, as dialkyl or aralkyl peroxides, e.g., dicumyl peroxide, and ditertiary butyl peroxide; and alkyl perester peroxides, e.g., ditertiary butyl diperphthalate and tertiary butyl perbenzoate. Dicumyl peroxide and ditertiary butyl peroxide are preferred. Benzoyl peroxide is preferred for polyester resins.

Curable polymers in the mix, within the purview of this invention, comprise thermosetting resins, e.g., polydiolefins, polyesters, melamines, and silicones. However, the diolefin homopolymers and copolymers are preferred. This invention is also effective for stabilizing polyesters against degrading due to oxygen and heat, but for uses at high temperatures reinforced plastics containing the diolefin homo- or copolymers are preferred. It is also effective for styrenes containing divinyl benzene or other suitable crosslinking agents to give an insoluble, non-thermoplastic set resin.

The preferred curable polymers are those which are prepared from $C_4$ to $C_6$ conjugated diolefins, such as butadiene, hexadiene, isoprene, dimethyl butadiene, piperylene, and methyl pentadiene. Diolefins may be used which are copolymerized with minor amounts of ethylenically unsaturated monomers as styrene, acrylonitrile, methyl vinyl ketone, or with styrenes having alkyl groups substituted on the ring, e.g., paramethyl styrene, and dimethyl styrene. An specially preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane-1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises. The preparation of this oil in the presence of an alkali metal or peroxide catalyst is described in U.S. Patents 2,762,851 and 2,586,594, which are incorporated herein by reference. The unsaturated polyesters as defined in this invention may be derived by the condensation of compounds containing polyhydroxyl and polycarboxyl groups and have an unsaturated carbon bond with a typical structure as indicated below:

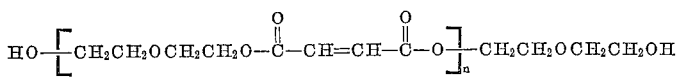

wherein $n$ represents the degree of polymerization. Appropriate unsaturated polyesters are obtained by condensing or esterifying such alpha-beta unsaturated dicarboxylic acids as maleic acid, fumaric acid, itaconic acid, and derivatives thereof containing a functioning ethyleneic group, with appropriate glycols such as ethylene glycol, diethylene glycol, other polyethylene glycols, propylene glycol-1,2 and the like. It is apparent that the polyesters of the ethylenically unsaturated dicarboxylic acids may also include a certain amount of a polyhydric alcohol such as pentaerythritol, sorbitol, mannitol, or the like. In general, these polyhydric alcohols include from 4 to 6 hydroxyls. They may also contain a certain proportion of combined saturated dibasic acid such as phthalic or isophthalic acid. The unsaturated polyesters are described in detail in U.S. Patents 2,688,006 and 2,769,742 which are incorporated herein by reference. They are available commercially under such trade names listed below:

a. Selectron Resins manufactured by Pittsburgh Plate Glass Company
b. Paraplex Resins manufactured by Resinous Products Division, Rohm and Haas Company
c. Vibrin Resins manufactured by Naugatuck Chemical Division, U.S. Ruber Company
d. Laminac Resins manufactured by American Cyanamid Company Another specific polyester which is suitable for this invention is a fumaric acid ester of an alkylene oxide condensate of bisphenol-A.

In accordance with this invention 0.1 to 4 parts, preferably 0.25 to 2 parts, of phenol anti-oxidant are incorporated in 100 parts by weight of the resinifiable polymer mix. The blocked or hindered phenol is defined in the present invention as a phenolic compound which is substituted in the 2 and 6 positions with organic groups, such as highly branched alkyl groups, which prevent the phenol entering into most chemical reactions characteristic of a phenol. These include reaction with acid chlorides, such as the chlorides or phosphorus, reaction with metals such as sodium and the like. For reasons of ease of synthesis and effectiveness, we prefer blocking the phenol at the 2 and 6 positions by means of a tertiary alkyl group, and preferably by the tertiary butyl group. Methods of synthesis of blocked phenol include alklation of available phenols with olefins or alkyl halides, using sulfuric acid of Friedel-Crafts catalysts. The compounds are subsequently purified by distillation, crystallization, or a combination thereof. The preparation and the types of blocked phenols are described in detail in Industrial and Engineering Chemistry, vol. 45, page 197, January 1953, which is included herein by reference.

The general formula is illustrated herebelow:

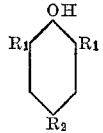

wherein each $R_1$ is independently selected from the group consisting of a tertiary alkyl radical containing not more than 8 carbon atoms and another blocked phenol which may be attached through the tertiary alkyl group; and $R_2$ is selected from the group consisting of hydrogen, an alkyl radical having 1 to 4 carbon atoms and another blocked phenol group which may be attached directly to the para cabon atom or through one alkylene group.

The especially preferred compound is commonly named 2,6,-di-t-butyl para cresol which has the following structure:

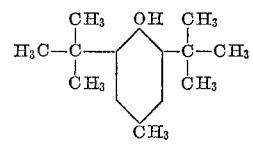

Other preferred compounds are as follows:

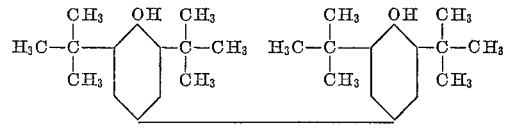

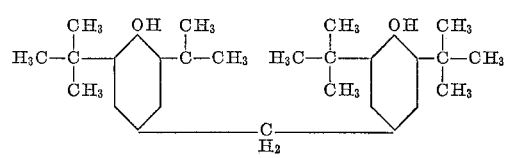

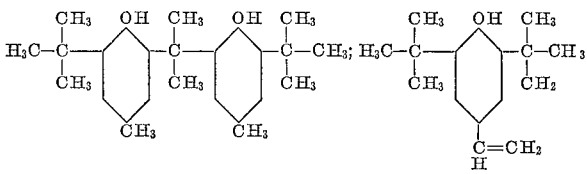

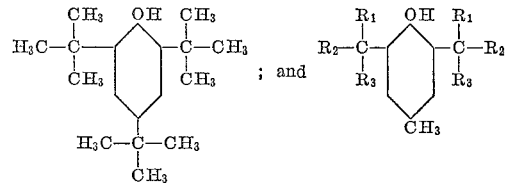

wherein $R_1 + R_2 + R_3 = C_7$.

In the present invention a reinforcing element is laminated with the resinifiable polymer mix, heretofore described. A reinforced plastic and/or a laminate, according to this invention, is defined as a composite mass of a reinforcing agent and a thermosetting resin. This, therefore, includes layers of cloth and resin; fibers embedded in a resin; and fibers saturated with resin and formed in a hollow cylindrical pipe. Accordingly, lamination can be accomplished by any known method. For example, the resin mix can be combined with glass cloth by brush impregnation; by being poured into the center of several piles of dry cloth assembled on cellophane-covered glass plate; or by dipping the cloth into the resin mix. Thus, one method used in the manufacture of solid rectangular sheets, is to form layers of curable polymer mix and glass fiber. After the desired thickness is obtained, the sheet is cured to a unitary reinforced plastic. Another method can be used for the manufacture of cylindrical hollow pipes. Glass fibers can be dipped in the resinifiable mix and wound about a steel mandrel. This can be accomplished by any method. In one method, the fiber rovings, e.g., glass fibers, are wound at an angle to the axis of the mandrel circumferentially in superimposed layers to form a peripheral shell of the pipe (U.S.P. 2,714,414). After the desired shape is obtained, the wrapping can be cured to form the unitary rigid pipe.

The reinforcing elements laminated with the resinifiable polymeric mix are subsequently cured by any known method. A suitable method for a polydiolefin mix is by baking in a press mold at a temperature between 250° and 400° F. for between 5 minutes and 2 hours with an optional postcure at a temperature between 290° and 400° F. for 1 to 24 hours. A polyester mix is preferably cured between ambient temperature and about 300° F. Thus in accordance with this invention, it is now possible to provide a reinforced plastic with improved aging properties. For example, a polydiolefin reinforced laminate is capable of withstanding relatively high temperatures without a pronounced decrease in strength occurring therein. Consequently it is now possible to use this end product for applications up to 500° F. and higher where resistance to aging is of major importance.

Furthermore, the blocked phenols can be utilized in monomers which are polymerized to rubbery or thermoplastic polymers. Although this invention is particularly applicable to thermosetting compounds, it may be also used advantageously for synthetic rubbers and thermoplastics. Use of the blocked phenol anti-oxidant in the monomer feed when preparing such materials is in many cases more economical and more effective than when adding it to the polymerizate in the usual manner. In addition, the blocked phenol may be useful as a component in a polydiolefin size or a vinyl silane finishing agent which may be applied to the surface of the reinforcing elements, for example glass fibers. Such anti-oxidants retard the aging and oxidation of such organic materials during the drying, storage, and transportation of such reinforcing agents prior to their use in reinforced plastics. The blocked phenols are particularly applicable for this since they do not interfere in the subsequent end use in thermosetting resins.

The following examples are submitted to illustrate and not to limit this invention. Unless otherwise indicated all parts and percentages are based on the total weight of the resinifiable mix.

EXAMPLE I

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 Kauri-Butanol value (reference scale: Benzene—100 K.B. value, n-heptane, 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and all of the solvent removed by stripping to give a product of essentially 100% NVM. The resulting product had a viscosity of 1.5 poise at 50% NVM in Varsol solution and the non-volatile portion thereof had an average molecular weight of about 8,000.

A resinifiable polymeric mix was prepared with the above copolymer with other compounds included therein as shown in Table I. Three to four grams of each mix were placed in a test tube and were subsequently heated in an oil bath to 260° F. The time for gelation was recorded as indicated in Table I. Other mixes were prepared without the copolymer.

Table I

| Compounds (parts by wt.) | 1 | 2 | 3 | 4 | 5 | 6 | 7 | 8 | 9 |
|---|---|---|---|---|---|---|---|---|---|
| Copolymer | 50 | 50 | 50 | 50 | 50 | | | | |
| Vinyl toluene | 50 | 50 | 50 | 50 | 50 | 100 | 100 | 100 | 100 |
| Dicumyl peroxide | 3 | 3 | 3 | 3 | 3 | 1 | 1 | 1 | 1 |
| Ditertiary butyl peroxide | 3 | 3 | 3 | 3 | 3 | | | | |
| Phenyl beta naphthylamine | | 2 | | | | | | | |
| Aminox [a] | | | 2 | | | | | | |
| Anti-oxidant-2246 [b] | | | | 2 | | | | | |
| 2,6-di-t-butyl para cresol | | | | | 2 | 1 | | | |
| AN-2 [c] | | | | | | | 1 | | |
| Tri-t-butyl phenol | | | | | | | | 1 | |
| Trisphenol [d] | | | | | | | | | 1 |
| Time to gel (min.) | 11 | >50 | >50 | 26 | 12 | 19 | 19 | 20 | >60 |

[a] Reaction product of an aldehyde and a secondary aromatic amine.
[b] A bisphenol in which one of the ortho positions is linked to a methylene group, and the other a tertiary butyl group. Each has a methyl group in the 4-position.

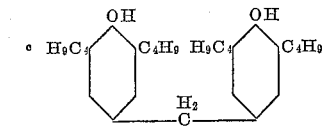

[c]

[d] Three phenolic groups joined by methylene groups, partially blocked.

This example demonstrates that a blocked phenol can be incorporated in a resinifiable mix without hindering the catalytic setting therein as per Nos. 5, 6, 7, and 8, in Table I; whereas other anti-oxidants and/or partially blocked phenols inhibit the setting of the resin as per Nos. 2, 3, 4, and 9, in Table I.

EXAMPLE II

Three resinifiable polymeric mixes were formed from the copolymer of Example I and other compounds as indicated in Table II. Glass fabric (181 containing a vinyl silane finish) was saturated with mix A and placed in a ⅛″ mold with subsequent curing at 290° F. for 45 minutes. A postcure for 16 hrs. at 300° F. was also employed in order to provide laminate A. Laminates B and C were prepared in a similar manner with the other two mixes. The flexural strength of each laminate was determined. Furthermore, portions of each laminate wrapped in aluminum foil were exposed to a temperature of 500° F. for 72 hrs. in an air oven. Flexural strengths were also determined on these aged specimens.

Table II

| Compounds (parts by wt.) | A | B | C |
|---|---|---|---|
| Copolymer | | 50 | |
| Vinyl toluene | | 50 | |
| Dicumyl peroxide | | 3 | |
| Di-t-butyl peroxide | | 3 | |
| 2,6,-di-t-butyl para cresol | | 2 | |
| Aminox | | | 1 |
| Flexural Strength after curing (p.s.i.) | 59,000 | 60,000 | 48,000 |
| Flexural Strength after aging (p.s.i.) | 53,000 | 60,000 | |

It is manifest from this example that the aging properties of a laminate can be improved by incorporating a blocked phenol in the resinifiable polymeric mix. In contrast, however, the incorporation of an amine-type anti-oxidant will have an adverse effect upon the flexural strength as demonstrated in laminate C above.

EXAMPLE III

The copolymer of Example I was combined with various compounds to provide three resinifiable polymeric mixes as shown in Table III. Fourteen plies of 181 glass cloth with A–172 vinyl silane finish thereon (a vinyl silane ester of the monoethyl ether of ethylene glycol) were impregnated with mix A. Laminate D was formed as follows: The saturated plies of glass cloth were placed in a ⅛″ mold; cured for one hour at 300° F.; and postcured for 2 hrs. at 320° F. Laminates E and F were similarly prepared containing anti-oxidants as shown, and the flexural strength of each laminate is indicated herebelow.

Table III

| Compound (parts by wt.) | D | E | F |
|---|---|---|---|
| Copolymer | | 50 | |
| Vinyl toluene | | 50 | |
| Dicumyl peroxide | | 1.5 | |
| Di-t-butyl peroxide | | 1.5 | |
| 2,6-di-t-butyl para cresol | 1 | | |
| AN-2 | | 1 | |
| AN-12 ᵃ | | | 1 |
| Flexural Strength (p.s.i.) | 51,000 | 46,000 | 46,000 |

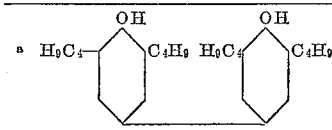

This example demonstrates that these three blocked phenols can be incorporated into a laminate in order to improve its aging properties. However, other types of phenols or antioxidants would cause a substantial decrease in flexural strength and would not be suitable for this invention.

EXAMPLE IV

Laminates G and H were prepared by saturating 14 plies of 181 glass cloth having a 136 vinyl silane finish thereon, with the resinifiable mixes as indicated in Table IV. The saturated plies of cloth were inserted into a 1/8" cavity mold and cured for one hour at 310° F. The flexural strength of each laminate therefrom was measured. Furthermore, the resistance to hot water was determined by placing each laminate under stress of 29,000 p.s.i. for one hour and increasing the stress to 38,000. The time for failure under the higher stress was recorded. The physical properties of laminates are also indicated in Table IV.

Table IV

| Compounds in the Mix (parts by wt.) | G | H |
|---|---|---|
| Copolymer of Example I | 60 | 60 |
| Vinyl toluene | 40 | 40 |
| Divinyl benzene (84%) | 1.2 | 1.2 |
| Vinyl silane (A-172) | 0.25 | 0.25 |
| Dicumyl peroxide | 2 | 2 |
| t-butyl peroxide | 2 | 2 |
| AN-2 | | 0.5 |
| Flexural Strength, room temp. (p.s.i.) | 48,000 | 47,000 |
| Flexural Strength, 170° F. (p.s.i.) | 38,500 | |
| Resistance to hot water (min.) | 18 | >60 |

The results of this example show that the resistance of a polydiolefin reinforced plastic is increased by incorporating a blocked phenol therein.

EXAMPLE V

Polyester reinforced laminates, I, J, K, and L were formed by saturating 14 plies of the glass cloth of Example IV with the resinifiable mixes tabulated herebelow. The saturated plies were cured in a press mold with a subsequent postcure as shown in Table V. The resistance to hot water was determined for each laminate as per Example IV.

Table V

| Compounds in the Mix (parts by wt.) | I | J | K | L |
|---|---|---|---|---|
| Atlac-382 ᵃ | | 50 | | |
| Vinyl toluene | | 50 | | |
| Dicumyl peroxide | | 1 | | |
| AN-2 | | | 0.5 | 0.5 |
| Temp. for curing (° F.) | | 275 | | |
| Time for curing (hr.) | | 1 | | |
| Temp. for postcure (° F.) | | 300 | | 300 |
| Time for postcure (hr.) | | 1 | | 1 |
| Resistance to hot water (hr.) | 1–4.5 | 1–33 | >1–120 | >1–175 |

ᵃ Atlac-382. A polyester product of the Atlas Powder Co., a fumaric acid ester of alkylene oxide condensate of bisphenol-A. The acid number is 20–25. It is usually used as a 55/45 weight ratio with styrene.

This example shows that the incorporation of a blocked phenol increases the hot water resitsance of a polyester reinforced plastic.

EXAMPLE VI

Laminates M, N, O, P, Q, and R were prepared by a similar procedure described in Example V with the resinifiable mixes shown in Table VI. The conditions of the cure and postcure were recorded and the flexural strength of each laminate was measured.

Table VI

| Compound in the Mix (parts by wt.) | M | N | O | P | Q | R |
|---|---|---|---|---|---|---|
| Methyl styrene | | | | 97 | | |
| Divinyl benzene | | | | 3 | | |
| Vinyl silane (A-172) | | | | 0.5 | | |
| Dicumyl peroxide | | | | 1.0 | | |
| 2,6-di-t-butyl-p-cresol | | | 1 | 1 | | |
| AN-2 | | | | | 1 | 1 |
| Temp. for curing (° F.) | | | | 275 | | |
| Time for curing (hr.) | | | | 1 | | |
| Temp. for postcure (° F.) | | 300 | | 300 | | 300 |
| Time for postcure (hr.) | | 2 | | 2 | | 2 |
| Flexural Strength after aging ¹ | 24,500 | 25,000 | 50,000 | 49,000 | 47,000 | 49,500 |

¹ Specimens 3 x ½ x ⅛ exposed to air at 500° F. for one week.

The aging properties of a styrene-divinyl benzene reinforced plastic are vastly improved by incorporating a blocked phenol therein.

Having described the general nature and specific embodiments of the present invention, the true scope is now particularly pointed out in the appended claims.

What is claimed is:

1. A method which comprises laminating glass fabric with a thermosetting resinifiable polymeric mix comprising 50 parts of a liquid copolymer of 80% butadiene with 20% styrene, 50 parts of vinyl toluene, and 2 parts of 2,6-di-t-butyl para cresol; and curing said laminate at a temperature of 290° F. for 45 minutes in the presence of 3 parts of dicumyl peroxide and 3 parts of ditertiary butyl peroxide as catalysts to provide a unitary product with improved aging properties.

2. A laminate which comprises glass fabric and a thermosetting resin; said resin comprising 50 parts of a copolymer of 80% butadiene with 20% styrene, 50 parts of vinyl toluene, and 2 parts of 2,6-di-t-butyl para cresol; said resin having been cured at a temperature of 290° F. for 45 minutes in the presence of 3 parts of dicumyl peroxide and 3 parts of ditertiary butyl peroxide as catalysts to provide a unitary product with improved aging properties.

3. A method which comprises preparing a normally liquid thermosetting resinifiable polymerizable mix containing a normally liquid curable ethylenically unsaturated polymer, a monomeric polymerizable ethylenically unsaturated crossinking agent, a blocked phenol having the formula:

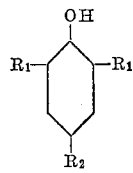

wherein each $R_1$ is independently selected from the group of radicals consisting of a tertiary alkyl radical containing up to 8 carbon atoms per radical and another blocked phenol radical attached to a tertiary carbon atom of said tertiary alkyl radical and $R_2$ is independently selected from the group consisting of hydrogen, an alkyl radical having from 1 to 4 carbon atoms and another blocked phenol radical attached through its para carbon atom, and a peroxide catalyst and heat curing said mix.

4. A method as in claim 3 wherein the normally liquid curable ethylenically unsaturated polymer is a normally liquid polymer of a $C_4$ to $C_6$ conjugated diolefin.

5. A method as in claim 3 wherein the normally liquid curable ethylenically unsaturated polymer is a normally liquid copolymer of a $C_4$ to $C_6$ conjugated diolefin and a styrene selected from the group consisting of styrene, an alkyl styrene, and a halo styrene.

6. A method as in claim 3 wherein the normally liquid curable ethylenically unsaturated polymer is a copolymer of butadiene and styrene.

7. A method as in claim 3 wherein the normally liquid curable ethylenically unsaturated polymer is an unsaturated polyester.

8. A thermoset resin, comprising a normally liquid thermosetting resinifiable polymerizable mix containing a normally liquid curable ethylenically unsaturated polymer, a monomeric polymerizable ethylenically unsaturated crosslinking agent, a blocked phenol having the formula:

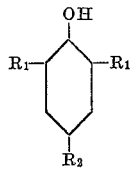

wherein each $R_1$ is independently selected from the group of radicals consisting of a tertiary alkyl radical containing up to 8 carbon atoms per radical and another blocked phenol radical attached to a tertiary carbon atom of said tertiary alkyl radical and $R_2$ is independently selected from the group consisting of hydrogen, an alkyl radical having from 1 to 4 carbon atoms and another blocked phenol radical attached through its para carbon atom, and a peroxide catalyst, said mix having been heat cured.

9. A reinforced thermoset resin comprising a reinforcing element, a normally liquid thermosetting resinifiable polymerizable mix containing a normally liquid curable ethylenically unsaturated polymer, a monomeric polymerizable ethylenically unsaturated crosslinking agent, a blocked phenol having the formula:

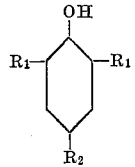

wherein each $R_1$ is independently selected from the group of radicals consisting of a tertiary alkyl radical containing up to 8 carbon atoms per radical and another blocked phenol radical attached to a tertiary carbon atom of said tertiary alkyl radical and $R_2$ is independently selected from the group consisting of hydrogen, an alkyl radical having from 1 to 4 carbon atoms and another blocked phenol radical attached through its para carbon atom, and a peroxide catalyst, said reinforced mix having been heat cured.

10. A thermoset resin as in claim 8, wherein the normally liquid curable ethylenically unsaturated polymer is a normally liquid polymer of a $C_4$ to $C_6$ conjugated diolefin.

11. A reinforced thermoset resin as in claim 9, wherein the reinforcing element is glass fibers.

12. A reinforced thermoset resin as in claim 9, wherein the normally liquid curable ethylenically unsaturated polymer is a normally liquid polymer of a $C_4$ to $C_6$ conjugated diolefin.

13. A reinforced thermoset resin as in claim 9, wherein the normally liquid curable ethylenically unsaturated polymer is a normally liquid copolymer of a $C_4$ to $C_6$ conjugated diolefin and a styrene selected from the group consisting of styrene, an alkyl styrene, and a halo styrene.

14. A thermoset resin as in claim 8, wherein the normally liquid curable ethylenically unsaturated polymer is a normally liquid copolymer of a $C_4$ to $C_6$ conjugated diolefin and a styrene selected from the group consisting of styrene, an alkyl styrene, and a halo styrene.

15. A reinforced thermoset resin as in claim 9, wherein the normally liquid curable ethylenically unsaturated polymer is a normally liquid copolymer of butadiene and styrene.

16. A fiber reinforced plastic pipe which comprises a reinforcing fiber laid up circumferentially in superimposed layers to form the peripheral shell of the pipe, said fibers being bonded with a thermoset resin, prepared from a normally liquid thermosetting resinifiable polymerizable mix containing a normally liquid curable ethylenically unsaturated polymer, a monomeric polymerizable ethylenically unsaturated crosslinking agent, a blocked phenol having the formula:

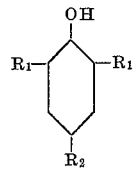

wherein each $R_1$ is independently selected from the group of radicals consisting of a tertiary alkyl radical containing up to 8 carbon atoms per radical and another blocked phenol radical attached to a tertiary carbon atom of said tertiary alkyl radical and $R_2$ is independently selected from the group consisting of hydrogen, an alkyl radical having from 1 to 4 carbon atoms and another blocked phenol radical attached through its para carbon atom, and a peroxide catalyst, said reinforced mix having been heat cured to provide a unitary product with improved aging properties.

17. A fiber reinforced plastic pipe as in claim 16 wherein the normally liquid curable ethylenically unsaturated polymer is a normally liquid polymer of a $C_4$ to $C_6$ conjugated diolefin.

18. A fiber reinforced plastic pipe as in claim 16 wherein the normally liquid curable ethylenically unsaturated polymer is a normally liquid copolymer of a $C_4$ to $C_6$ conjugated diolefin and a styrene selected from the group consisting of styrene, an alkyl styrene, and a halo styrene.

19. A fiber reinforced plastic pipe as in claim 16 wherein the normally liquid curable ethylenically unsaturated polymer is a copolymer of butadiene and styrene.

References Cited in the file of this patent

UNITED STATES PATENTS

| | | |
|---|---|---|
| 2,460,300 | Le Fevre et al. | Feb. 1, 1949 |
| 2,581,907 | Smith et al. | Jan. 8, 1952 |
| 2,690,412 | Nebesar | Sept. 28, 1954 |
| 2,703,774 | Morrison | Mar. 8, 1955 |
| 2,763,573 | Biefeld | Sept. 18, 1956 |
| 2,797,207 | Burke | June 25, 1957 |
| 2,835,642 | Safford | May 20, 1958 |
| 2,836,577 | Kolka | May 27, 1958 |
| 2,845,411 | Willis | July 29, 1958 |
| 2,877,209 | Jansen et al. | Mar. 10, 1959 |
| 2,909,504 | Spacht | Oct. 20, 1959 |
| 2,944,086 | Coffield et al. | July 5, 1960 |
| 2,944,994 | Singleton et al. | July 12, 1960 |
| 2,953,543 | Pike | Sept. 20, 1960 |
| 2,957,833 | Baum | Oct. 25, 1960 |
| 2,975,216 | Spacht | Mar. 14, 1961 |